US012686258B2

(12) United States Patent
Kim

(10) Patent No.: US 12,686,258 B2
(45) Date of Patent: Jul. 21, 2026

(54) HYBRID DRIVING MODULE

(71) Applicant: VALEO KAPEC CO., LTD., Daegu (KR)

(72) Inventor: Jung-Woo Kim, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 341 days.

(21) Appl. No.: 18/345,144

(22) Filed: Jun. 30, 2023

(65) Prior Publication Data

US 2024/0001755 A1  Jan. 4, 2024

(30) Foreign Application Priority Data

Jul. 1, 2022  (KR) ........................ 10-2022-0081411

(51) Int. Cl.
*F16H 45/02* (2006.01)
*B60K 6/383* (2007.10)
(Continued)

(52) U.S. Cl.
CPC ................ *B60K 6/40* (2013.01); *B60K 6/383* (2013.01); *B60K 6/48* (2013.01); *F16H 45/02* (2013.01);
(Continued)

(58) Field of Classification Search
CPC ... F16H 45/02–2045/0294; B60K 6/40; B60K 6/48; B60K 6/383
See application file for complete search history.

(56) References Cited

U.S. PATENT DOCUMENTS 8,585,541 B2  11/2013  Mueller
10,167,907 B2 *  1/2019  Satoyoshi ................ B60K 6/48
(Continued)

FOREIGN PATENT DOCUMENTS

JP  2011-524292 A  9/2011
JP  2012-96677 A  5/2012
(Continued)

OTHER PUBLICATIONS

Korean Office Action issued Dec. 7, 2023 in Korean Patent Application No. 10-2022-0081411 (with unedited computer-generated English translation), 8 pages.
(Continued)

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

The present invention relates to a hybrid driving module having a structure that is compact in an axial direction and easily manufactured and assembled, and the hybrid driving module includes a rotor hub configured to support a rotor, connected to an engine, and configured to receive power of the engine, a first power transmission route configured to connect the rotor hub and an output member, and a second power transmission route provided in parallel with the first power transmission route and configured to connect the rotor hub and the output member, in which the rotor hub has a radial extension portion, and an axial extension portion connected to an outer periphery of the radial extension portion, in which a lock-up clutch and a damper, which control connection and disconnection between the rotor hub and the output member, are provided in the second power transmission route, and in which at least a part of the lock-up
(Continued)

clutch and at least a part of the damper are disposed radially inside the axial extension portion.

16 Claims, 3 Drawing Sheets

(51) Int. Cl.
    *B60K 6/40*     (2007.10)
    *B60K 6/48*     (2007.10)
    *F16H 45/00*     (2006.01)

(52) U.S. Cl.
    CPC ... *B60K 2006/4825* (2013.01); *B60Y 2200/92* (2013.01); *F16H 2045/002* (2013.01); *F16H 2045/0221* (2013.01); *F16H 2045/0294* (2013.01)

(56)         References Cited

U.S. PATENT DOCUMENTS

2008/0173510 A1 *   7/2008   Saka ....................... F16H 45/02
                                         192/3.28

| | | | | |
|---|---|---|---|---|
| 2010/0062899 | A1 * | 3/2010 | Engelmann | ......... F16D 25/0638 |
| | | | | 903/914 |
| 2011/0154944 | A1 | 6/2011 | Mueller | |
| 2020/0072332 | A1 * | 3/2020 | Norwich | ............... F16H 61/148 |
| 2021/0180652 | A1 * | 6/2021 | Payne | ..................... F16H 45/02 |
| 2022/0371429 | A1 * | 11/2022 | Walega | .................... B60K 6/48 |

FOREIGN PATENT DOCUMENTS

| | | | | |
|---|---|---|---|---|
| KR | 10-2004-0030427 | A | 4/2004 | |
| KR | 10-0708595 | B1 | 4/2007 | |
| KR | 10-2008-0033698 | A | 4/2008 | |
| KR | 10-2021-0072494 | A | 6/2021 | |
| WO | WO-2008025691 | A1 * | 3/2008 | ............ B60K 6/485 |
| WO | WO 2021/081508 | A1 | 4/2021 | |

OTHER PUBLICATIONS

Written Decision on Registration issued Jul. 24, 2024, in corresponding Korean Patent Application No. 10-2022-0081411 (with English Translation), 5 pages.

\* cited by examiner

HYBRID DRIVING MODULE

CROSS-REFERENCE TO RELATED APPLICATIONS

This application claims priority to and the benefit of Korean Patent Application No. 10-2022-0081411 filed in the Korean Intellectual Property Office on Jul. 1, 2022, the entire contents of which are incorporated herein by reference.

TECHNICAL FIELD

The present invention relates to a hybrid driving module, and more particularly, to a hybrid driving module having a structure that is compact in an axial direction and easily manufactured and assembled.

BACKGROUND ART

A driving module used for a hybrid vehicle has a structure configured to transmit a force of a motor and a force of an engine to a transmission. A hybrid driving module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may have a structure configured to connect the motor directly to the output member or including a torque converter and a lock-up clutch.

WO 2021-081508 A1 discloses that a power transmission part, which connects a motor and an output member, has a torque converter and a lock-up clutch, and two torsional dampers (hereinafter, also simply referred to as 'dampers') configured to absorb vibration of power are provided in series between the lock-up clutch and the output member. The configuration in which the dampers are provided in series as described above facilitates design of a low-rigid damper. However, in case that the torsional dampers are provided in an axial direction between the lock-up piston and the torque converter as disclosed in WO 2021-081508 A1, a volume of a hybrid driving module inevitably increases in the axial direction.

US 2021/0180652 A1 discloses a structure in which a single damper is disposed between an input member and an engine clutch, and an additional damper is disposed between a motor and an output member. However, as in WO 2021-081508 A1, the damper is still disposed between a lock-up piston and a torque converter, which makes it difficult to design a compact hybrid driving module.

KR 10-0708595 B1 discloses that a damper is disposed in a radially inner side instead of a torus of a torque converter, and a section occupied by the damper in an axial direction partially overlaps a section occupied by the torus. The arrangement disclosed in KR 10-0708595 B1 enables compact design, unlike those in WO 2021-081508 A1 and US 2021/0180652 A1, but the effect is insufficient. Further, because a lock-up piston and the damper are fixed by riveting, which complicates an assembling process.

In particular, because a hybrid front-wheel-drive vehicle has an insufficient available space in an engine room, there is an acute need to design a compact hybrid driving module to improve mountability.

SUMMARY OF THE INVENTION

The present invention has been made in an effort to solve the above-mentioned problem, and an object of the present invention is to provide a hybrid driving module that is more compact in an axial direction as a space in a hybrid driving module occupied by a damper disposed in a power transmission part is minimized.

The present invention has also been made in an effort to provide a hybrid driving module that has a compact structure and is easily manufactured and assembled.

The present invention has also been made in an effort to provide a hybrid driving module in which a space, which is occupied in an axial direction by a lock-up piston connected to a damper, is also minimized, which reduces costs.

The technical objects of the present invention are not limited to the above-mentioned objects, and other objects and advantages of the present invention, which are not mentioned above, may be understood from the following descriptions and more clearly understood from the embodiment of the present invention. In addition, it can be easily understood that the objects and advantages of the present invention may be realized by means defined in the claims and a combination thereof.

To achieve the above-mentioned objects, an embodiment of the present invention provides a hybrid driving module including: a rotor hub configured to support a rotor, connected to an engine, and configured to receive power of the engine; a first power transmission route configured to connect the rotor hub and an output member; and a second power transmission route provided in parallel with the first power transmission route and configured to connect the rotor hub and the output member.

The rotor hub of the hybrid driving module may have a radial extension portion, and an axial extension portion connected to an outer periphery of the radial extension portion.

For example, a damper may be provided in the second power transmission route, and at least a part of the damper may be disposed radially inside the axial extension portion.

That is, the sections occupied by the damper and the axial extension portion in the axial direction may at least partially overlap each other.

For example, a lock-up clutch, which controls connection and disconnection between the rotor hub and the output member, may be provided in the second power transmission route, and at least a part of the lock-up clutch may be disposed radially inside the axial extension portion.

That is, the sections occupied by the lock-up clutch and the axial extension portion in the axial direction may at least partially overlap each other.

The lock-up clutch may have a lock-up piston configured to be movable in an axial direction, and at least a part of the lock-up piston may be disposed radially inside the axial extension portion.

That is, the sections occupied by the lock-up piston and the axial extension portion in the axial direction may at least partially overlap each other.

The lock-up piston may include: an inner radial extension portion extending in a radial direction while facing the radial extension portion of the rotor hub; and an axis-extension portion extending in the axial direction and having a front end connected to a centrifugal side end of the inner radial extension portion.

At least a part of the axis-extension portion may be disposed radially inside the axial extension portion of the rotor hub.

That is, the sections occupied by the axis-extension portion and the axial extension portion in the axial direction may at least partially overlap each other.

At least a part of the inner radial extension portion may be disposed radially inside the axial extension portion of the rotor hub.

That is, the sections occupied by the inner radial extension portion and the axial extension portion in the axial direction may at least partially overlap each other.

The damper may be provided between the lock-up clutch and the output member.

The damper may be disposed radially inside the lock-up clutch.

That is, the sections occupied by the damper and the lock-up clutch in the axial direction may at least partially overlap each other.

The damper may be disposed radially inside the lock-up piston.

That is, the sections occupied by the damper and the lock-up piston in the axial direction may at least partially overlap each other.

The damper may be disposed radially inside the axis-extension portion.

That is, the sections occupied by the damper and the axis-extension portion in the axial direction may at least partially overlap each other.

The damper may be spline-coupled to the lock-up piston so that a rotation thereof is restricted.

The damper may be spline-coupled to the axis-extension portion so that a rotation thereof is restricted.

The rotor hub and the engine may be connected through an engine clutch.

The engine clutch may be a one-way clutch.

The engine clutch may be provided forward of the radial extension portion of the rotor hub and disposed radially inside the axial extension portion of the rotor hub.

That is, the sections occupied by the engine clutch and the axial extension portion in the axial direction may at least partially overlap each other.

The damper may be disposed rearward of the radial extension portion of the rotor hub.

The damper may include: a damper spring; a cover plate connected to the lock-up clutch so that a rotation thereof is restricted, the cover plate being connected to the damper spring so that a rotation thereof is restricted; and a driven plate connected to the cover plate through the damper spring so that a rotation thereof is restricted, the driven plate being connected to the output member so that a rotation thereof is restricted.

The cover plate may be spline-coupled to the lock-up clutch so that a rotation thereof is restricted.

The inner radial extension portion and the axis-extension portion of the lock-up piston may be disposed rearward of the radial extension portion of the rotor hub.

The lock-up piston may further include an outer radial extension portion connected to a rear end of the axis-extension portion and extending in the radial direction.

A friction portion, which connects and disconnects the rotor hub and the lock-up piston, may be provided at a centrifugal side of the outer radial extension portion.

The friction portion may be a single-plate clutch or a single-facing portion.

The rotor hub may be connected to a cover configured to accommodate the first power transmission route and the second power transmission route.

The friction portion may come into contact with or separate from the cover.

A torque converter may be provided in the first power transmission route.

The torque converter may connect the cover and the output member.

The output member may be connected to an input end of a transmission so that a rotation thereof is restricted.

According to the hybrid driving module of the present invention, the lock-up clutch and the damper, which directly connect the rotor hub and the output member, are disposed to overlap the rotor hub in the axial direction, such that an axial dimension of the hybrid driving module may be more compactly implemented.

According to the present invention, only the configuration in which the lock-up piston and the damper are spline-coupled in the axial direction may restrict the rotation and enable the assembling, which makes the disassembling and assembling processes convenient.

The specific effects of the present invention, together with the above-mentioned effects, will be described along with the description of specific items for carrying out the present invention.

DETAILED DESCRIPTION

Figure 1:
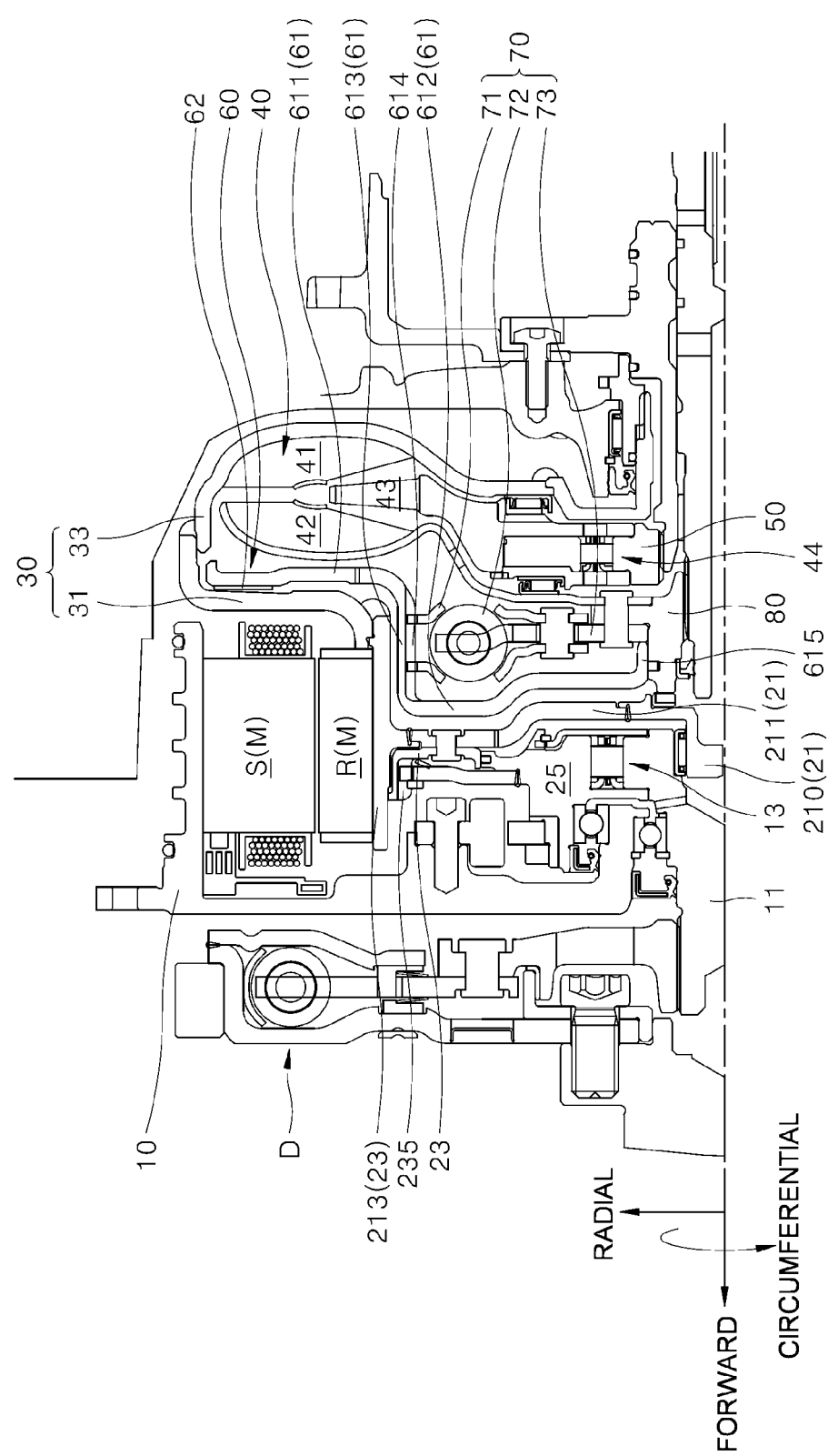
FIG. 1 is a cross-sectional view of a hybrid driving module according to the present invention.
Figure 2:
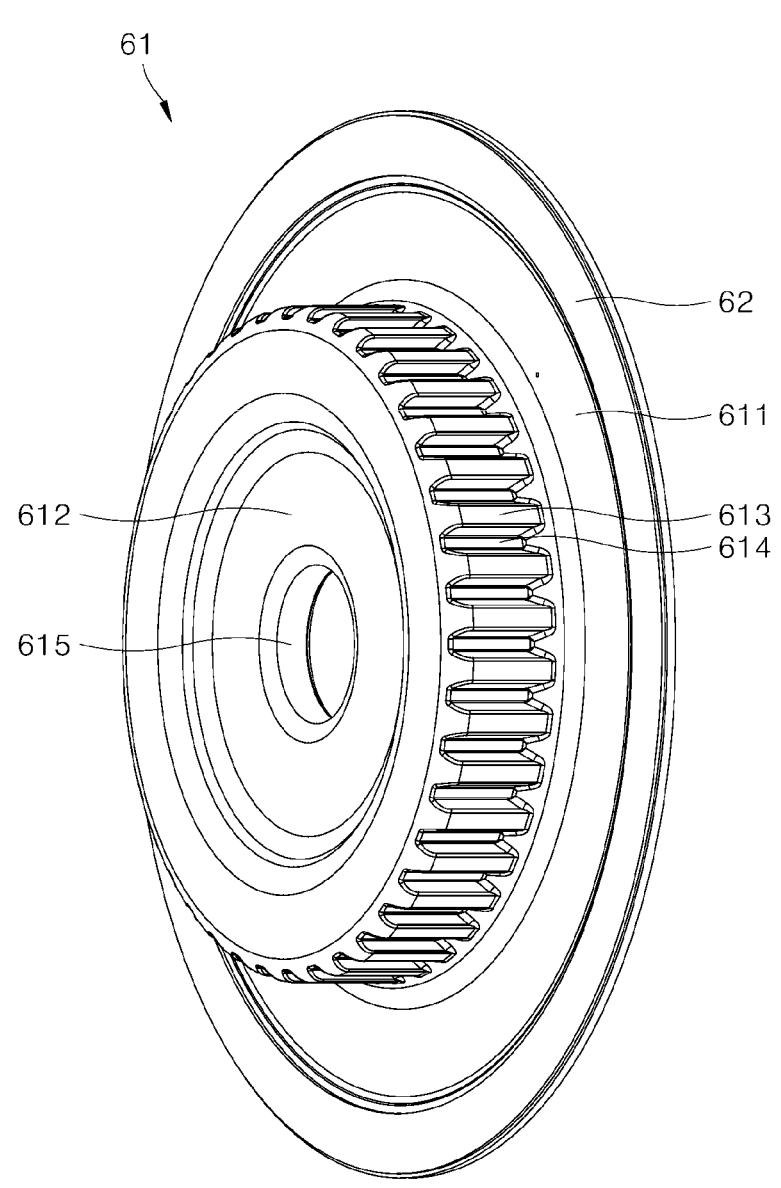
FIGS. 2 and 3 are front and rear perspective views of a lock-up piston of the hybrid driving module according to the present invention.
Figure 3:
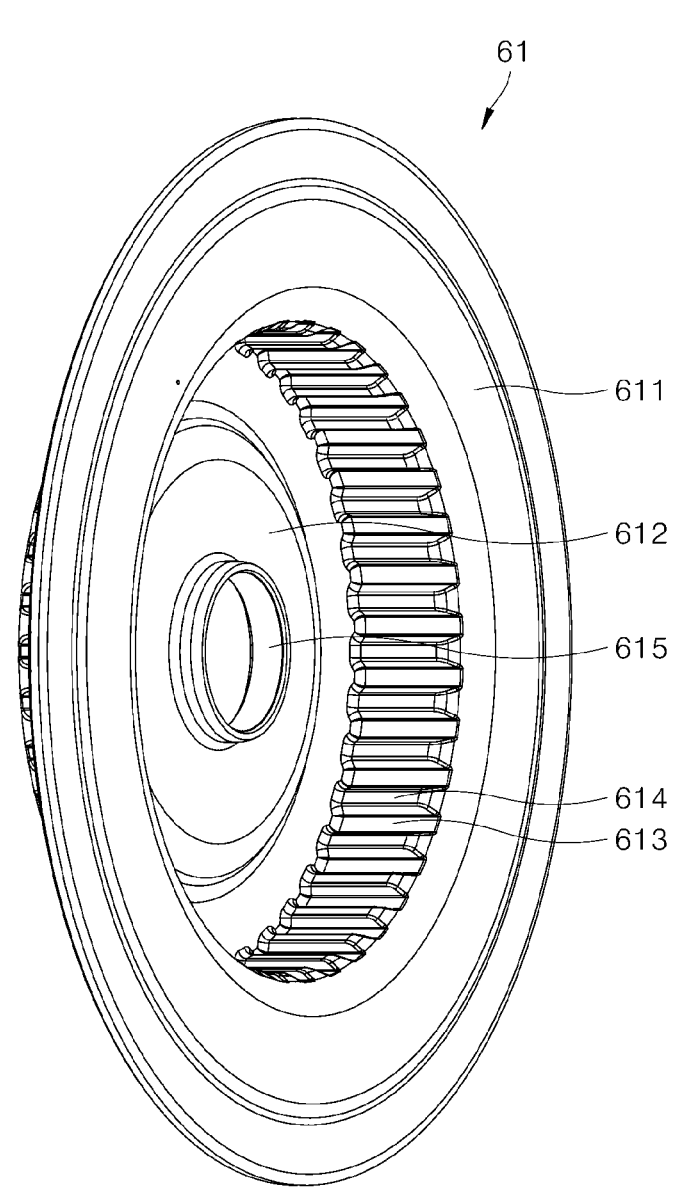

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid driving module according to an embodiment is symmetrical with respect to an axis, only the half of the hybrid driving module based on the axis is illustrated for the convenience of illustration. In addition, for the convenience of description, a direction along a longitudinal direction of an axis defining a center of a rotation of the hybrid driving module is defined as an axial direction. That is, a forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing rearward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

In one embodiment according to the present invention, the illustrated hybrid driving module includes a housing 10, and an input member 11 disposed at a center of a front side of the housing 10 and connected to an engine side. The input member 11 receives power of an engine (not illustrated) inputted through an engine side damper D from a component disposed forward of the housing 10.

The input member 11 is rotatably supported on the housing 10 by means of a bearing. The input member 11 is connected to a rotor hub 21 through an engine clutch 13. The housing 10 supports a stator S of a motor M. Further, a rotor R of the motor M is disposed radially inside the motor M and coupled to an outer peripheral surface of the rotor hub 21, such that the rotor R rotates integrally with the rotor hub 21.

A center shaft part 210 is provided at a radial center of the rotor hub 21 and supported to be rotatable relative to the input member 11 by means of a bearing. The rotor hub 21 has a radial extension portion 211 extending radially outward from the center shaft part 210, and an axial extension portion 213 extending axially from a centrifugal end of the radial extension portion 211. The rotor R is fixed to an outer peripheral surface of the axial extension portion 213.

The axial extension portion 213 includes a part extending forward from the radial extension portion 211, and a part extending rearward from the radial extension portion 211. Therefore, a predetermined first space is disposed forward of the radial extension portion 211 and provided radially inside the axial extension portion 213. In addition, a predetermined second space is disposed rearward of the radial extension portion 211 and provided radially inside the axial extension portion 213.

The engine clutch 13 is disposed in the first space. The engine clutch 13 may be a one-way clutch. The input member 11 is connected to one side (radially inner side) of the engine clutch 13, and a connection member 25 is connected to the other side (radially outer side) of the engine clutch 13.

A spline portion 235 is provided at an inner periphery of the axial extension portion 213 that defines the first space. The spline portion 235 is spline-coupled to the connection member 25, such that the mutual rotations thereof are restricted.

According to the embodiment, the spline portion 235 may be disposed at the inner periphery of the axial extension portion 213 by means of a spline ring 23 fixed to the rotor hub 21. The spline ring 23 may be disposed forward of the radial extension portion 211 of the rotor hub 21 and fixed to the radial extension portion 211 by a fixing means such as a rivet. The spline portion 235 extending forward may be provided at an outer periphery of the spline ring 23. Meanwhile, alternatively, the spline portion 235 may be formed directly on an inner peripheral surface of the axial extension portion 213.

The connection member 25 is rotatably supported on the housing 10 by means of a bearing. That is, the input member 11 and the connection member 25 are rotatably supported on the housing 10 by means of bearings.

The connection member 25, the engine clutch 13, and the input member 11 may be disposed forward of the rotor hub 21 and inserted and accommodated into the first space of the rotor hub 21. In case that the engine clutch 13 is configured as a one-way clutch, the connection member 25 may be configured as an outer race, and the connection member 25 may be configured as an inner race.

According to the present invention, the one-way clutch is used as the engine clutch 13, thereby simplifying the configuration. Further, the engine clutch 13 is disposed in the first space, such that the engine clutch 13 does not occupy the space in the axial direction. Therefore, the hybrid driving module may be more compactly configured in the axial direction.

The rotor hub 21 may be connected to an output member 80 through a first power transmission route and connected to an output member 80 through a second power transmission route. The first power transmission route may be configured by a torque converter 40, and the second power transmission route may be configured by a lock-up clutch 60 and a damper 70. The first power transmission route and the second power transmission route are disposed in parallel in a power transmission system.

A cover 30 is connected to a rear end of the axial extension portion 213 of the rotor hub 21. The cover 30 includes a front cover 31 connected to the axial extension portion 213 and extending radially outward, and a rear cover 33 connected to a rear side of the front cover 31. The front cover 31 has a portion extending straight in the radial direction, and a friction portion 62 of the lock-up clutch 60, which will be described below, may adjoin or separate from the portion. A rear end of the rear cover 33 may be spline-coupled to an oil pump input end of the transmission.

An impeller 41 of the torque converter 40 is installed on a front surface of the rear cover 33. A turbine 42 is installed forward of the impeller 41. A reactor 43 is installed radially inside a space in which the impeller 41 and the turbine 42 face each other.

The reactor 43 may be connected to a fixed end 50 through a one-way clutch 44, and the fixed end 50 may be spline-coupled to a fixed shaft of the transmission so that a rotation thereof may be restricted. A turbine plate, which supports the turbine 42, may be fixed to the output member 80 by means of a fixing means such as a rivet.

As described above, the first power transmission route may be configured by the rotor hub 21, the front cover 31, the rear cover 33, the impeller 41, the turbine 42, and the output member 80 in this order.

In contrast, the second power transmission route may be configured by the rotor hub 21, the lock-up clutch 60, the damper 70, and the output member 80 in this order.

The lock-up clutch 60 and/or the damper 70 may be at least partially disposed in a second space defined by the axial extension portion 213 of the rotor hub 21. Therefore, a space occupied by the lock-up clutch 60 and/or the damper 70 in the axial direction may be minimized or eliminated. Therefore, the hybrid driving module may be more compactly configured in the axial direction.

The lock-up clutch 60 may have a lock-up piston 61 installed to be slidable relative to the output member 80.

The lock-up piston 61 may be disposed rearward of the rotor hub 21 and the front cover 31. The lock-up piston 61 may have a shape approximately corresponding to the radial extension portion 211, the axial extension portion 213, and the front cover 31.

Specifically, the lock-up piston 61 may have a sliding portion 615 extending in the axial direction and slidably installed on the output member 80 while surrounding an outer peripheral surface of the output member 80, an inner radial extension portion 612 extending radially outward from the sliding portion 615, an axis-extension portion 613 connected to a centrifugal side of the inner radial extension portion 612 and extending axially rearward, and an outer radial extension portion 611 connected to a rear side of the axis-extension portion 613 and extending radially outward.

The inner radial extension portion 612 has a shape approximately corresponding to the radial extension portion 211, the axis-extension portion 613 has a shape approximately corresponding to the axial extension portion 213, and the outer radial extension portion 611 has a shape approximately corresponding to the front cover 31.

The friction portion 62 is provided at a centrifugal side of a front surface of the outer radial extension portion 611. The friction portion 62 may be a single-facing friction plate configured as a single plate. Even though the friction plate is configured as a single plate, the friction plate may ensure sufficient transmission torque as long as a diameter of the friction plate in the radial direction is sufficiently ensured. According to the embodiment, the single-facing friction plate may be applied, thereby minimizing the space occupied by the lock-up clutch 60 in the axial direction.

As the lock-up piston 61 adjoins the front cover 31 through the friction portion 62 or separates from the front cover 31, the lock-up piston 61 may be connected to the rotor hub 21 or disconnected from the rotor hub 21.

Spline teeth 614 are provided on the axis-extension portion 613 of the lock-up piston 61. The spline teeth 614 provide a concave-convex shape to an inner peripheral surface of the axis-extension portion 613.

The inner radial extension portion 612 and the axis-extension portion 613 of the lock-up piston 61 may be accommodated in the second space from a rear side of the rotor hub 21. Therefore, the inner radial extension portion 612 and the axis-extension portion 613 of the lock-up piston 61 do not occupy the space in the hybrid driving module in the axial direction, which makes it possible to more compactly design the hybrid driving module in the axial direction.

The damper 70 is provided in the second power transmission route.

The damper 70 may be disposed between the lock-up clutch 60 and the output member 80 and connect the lock-up clutch 60 and the output member 80.

The damper 70 may have a plurality of damper springs 72 extending in a circumferential direction. Four to six damper springs 72 may be disposed at equal intervals in the circumferential direction. However, the number of damper springs is not limited thereto. The damper spring 72 may extend in an arc shape in the circumferential direction or extend rectilinearly. The damper springs 72 may be shaped such that an outer spring and an inner spring are disposed to overlap each other while defining concentricity.

The damper 70 may have a pair of cover plates 71 configured to cover front and rear sides of the damper spring 72. The cover plates 71 accommodate the damper springs 72. The cover plates 71 are disposed between the two damper springs 72 adjacent to each other in the circumferential direction and interfere with the two damper springs 72 in a rotation direction, such that the cover plates 71 may be connected to the damper springs 72 so that the rotations thereof are restricted.

A centrifugal side end of the cover plate 71 may have a shape complementary to the spline teeth 614 of the lock-up clutch 60 and be spline-coupled to the spline teeth 614.

The damper 70 has a driven plate 73 that is disposed between the two damper springs 72 adjacent to each other in the circumferential direction and rotationally interferes with the two damper springs 72, and the driven plate 73 is connected to the damper spring 72 so that a rotation thereof is restricted. The driven plate 73 is disposed between the pair of cover plates 71 disposed to be spaced apart from each other forward and rearward and does not interfere directly with the driven plate 73. The driven plate 73 is connected to the cover plate 71 through the damper spring 72 so that a rotation thereof is restricted.

A centrifugal side end of the driven plate 73 is disposed to interfere with the damper spring 72 in the circumferential direction, and a centripetal side end of the driven plate 73 is connected to the output member 80. The centripetal side end of the driven plate 73, the output member 80, and the turbine plate are integrally fixed by a fixing means such as a rivet.

The centripetal side ends of the pair of cover plates 71 are connected to a predetermined portion between the centrifugal side end and the centripetal side end of the driven plate 73 so that the relative rotations thereof are slightly enabled. The connection portions may restrict an acceptable displacement of the relative rotations of the pair of cover plates 71 and the driven plate 73.

A space, which corresponds to a rear side of the inner radial extension portion 612 of the lock-up piston 61 and corresponds to a radially inner side of the axis-extension portion 613, defines a third space in which the damper 70 is accommodated.

The damper 70 may be accommodated in the third space from a rear side of the lock-up piston 61. When the damper 70 is accommodated in the third space, the cover plate 71 may be spline-coupled to the axis-extension portion 613 of the lock-up piston 61, such that the mutual rotations thereof may be restricted. According to the present invention, the lock-up piston 61 and the damper 70 are configured to be spline-connected to each other, such that the lock-up piston 61 and the damper 70 are more conveniently assembled.

The inner radial extension portion 612 and the axis-extension portion 613 of the lock-up piston 61 are accommodated in the second space of the rotor hub 21, and the damper 70 is accommodated in the third space of the rotor hub 21, such that the damper 70 may be accommodated in the second space of the rotor hub 21.

With this arrangement, the damper 70 or at least a part of the damper 70 is disposed radially inside the axial extension portion 213 of the rotor hub 21. Therefore, the sections occupied by the damper 70 and the axial extension portion 213 in the axial direction may at least partially overlap each other.

Then, the damper 70 does not occupy the space in the hybrid driving module in the axial direction, which makes it possible to more compactly design the hybrid driving module in the axial direction.

In summary, the axial extension portion 213 and the inner radial extension portion 612 of the lock-up piston 61 of the lock-up clutch 60 are at least partially disposed radially inside the axial extension portion 213 and at least partially overlap the section occupied by the axial extension portion 213 in the axial direction.

In addition, the damper 70 is at least partially disposed radially inside the axial extension portion 213 and at least partially overlaps the section occupied by the axial extension portion 213 in the axial direction.

To ensure the transmission torque, the torque converter 40 may be disposed to radially overlap the outer radial extension portion 611 of the lock-up piston 61 in a predetermined section. As described above, the damper 70 is disposed radially inside the axial extension portion 213 of the rotor hub 21 and overlaps the rotor hub 21 in the axial direction, such that the turbine 42 and the outer radial extension portion 611 of the lock-up piston 61 may be disposed to be very close to each other.

According to the present invention described above, an axial length of the power transmission system may be more compactly implemented even though the power transmission system is configured between the rotor hub 21 and the output member 80 by the first power transmission route having the torque converter 40 and the second power transmission route having the lock-up clutch 60 and the damper 70.

Both the components of the first power transmission route and the second power transmission route may be accommodated in an internal space defined by the rotor hub 21 and the cover 30.

Hereinafter, an operation of the hybrid driving module according to the present invention will be described.

The engine and the motor rotate in the same direction. In case that a rotational speed of the rotor R is higher than a rotational speed of the engine, the engine clutch 13, which is configured as a one-way clutch, performs free wheeling. Therefore, the overall rotational force of the motor M is transmitted to the output member 80 without being transmitted to the engine.

In case that the rotational speed of the rotor R is lower than the rotational speed of the engine, the engine clutch 13 transmits the rotational force of the engine to the rotor hub 21.

In case that a rotational speed of the rotor hub 21 is higher than a rotational speed of the output member 80, the rotational torque of the rotor hub 21 is increased by the cover 30 and the torque converter 40 and transmitted to the output member 80. In this state, the lock-up piston 61 moves rearward, and the lock-up clutch 60 is kept in a disengaged state.

In case that the rotational speed of the output member 80 increases and approaches the rotational speed of the rotor hub 21, the lock-up piston 61 moves forward, and lock-up clutch 60 is locked. Then, the rotational force of the rotor hub 21 is transmitted to the output member 80 through the damper 70. In this state, the rotor hub 21 and the output member 80 are directly connected. That is, the rotational speed of the rotor hub 21 and the rotational speed of the output member 80 are equally maintained.

In case that the rotational speed of the output member 80 is higher than the rotational speed of the rotor hub 21, the rotational torque of the output member 80 is increased by the torque converter 40 and the cover 30 and transmitted to the rotor hub 21. This rotational force may be used for regenerative braking.

In case that the rotational speed of the output member 80 decreases and approaches the rotational speed of the rotor hub 21, the lock-up piston 61 may move forward, and the lock-up clutch 60 may be locked. Then, the rotational force of the output member 80 may be transmitted to the rotor hub 21 through the damper 70. This rotational force may also be used for regenerative braking.

As described above, various operation modes may be implemented by controlling the lock-up piston 61 in response to a difference in relative speed between the output member 80 and the rotor hub 21.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

What is claimed is:

1. A hybrid driving module comprising:
a rotor hub configured to support a rotor, connected to an engine, and configured to receive power of the engine;
a first power transmission route configured to connect the rotor hub and an output member; and
a second power transmission route provided in parallel with the first power transmission route and configured to connect the rotor hub and the output member, the second power transmission route not being overlapped with the first power transmission route,
wherein the rotor hub has a radial extension portion, and an axial extension portion connected to an outer periphery of the radial extension portion,
wherein a damper is provided in the second power transmission route, and
wherein at least a part of the damper is disposed radially inside the axial extension portion,
wherein a lock-up clutch, which controls connection and disconnection between the rotor hub and the output member, is provided in the second power transmission route,
wherein the lock-up clutch has a lock-up piston configured to be movable in an axial direction,
wherein the lock-up piston comprises:
an inner radial extension portion extending in a radial direction while facing the radial extension portion of the rotor hub; and
an axis-extension portion extending in the axial direction and having a front end connected to a centrifugal side end of the inner radial extension portion,
wherein at least a part of the axis-extension portion is disposed radially inside the axial extension portion of the rotor hub, and
wherein the damper is spline-coupled to the axis-extension portion so that a rotation thereof is restricted.

2. The hybrid driving module of claim 1, wherein the rotor hub and the engine are connected through an engine clutch.

3. The hybrid driving module of claim 2, wherein the engine clutch is a one-way clutch.

4. The hybrid driving module of claim 2, wherein the damper is disposed rearward of the radial extension portion of the rotor hub, and
wherein the engine clutch is provided forward of the radial extension portion of the rotor hub and disposed radially inside the axial extension portion of the rotor hub.

5. The hybrid driving module of claim 1, wherein a torque converter is provided in the first power transmission route.

6. The hybrid driving module of claim 1, wherein the lock-up piston further comprises an outer radial extension portion connected to a rear end of the axis-extension portion and extending in the radial direction, and
wherein a friction portion, which connects and disconnects the rotor hub and the lock- up piston, is provided at a centrifugal side of the outer radial extension portion.

7. The hybrid driving module of claim 6, wherein the friction portion is a single-facing portion.

8. The hybrid driving module of claim 6, wherein the rotor hub is connected to a cover configured to accommodate the first power transmission route and the second power transmission route, and
wherein the friction portion comes into contact with or separates from the cover.

9. The hybrid driving module of claim 1, wherein the lock-up clutch which controls connection and disconnection between the rotor hub and the output member, is provided in the second power transmission route,
wherein the damper comprises:
a damper spring;
a cover plate connected to the lock-up clutch so that a rotation thereof is restricted, the cover plate being connected to the damper spring so that a rotation thereof is restricted; and
a driven plate connected to the cover plate through the damper spring so that a rotation thereof is restricted, the driven plate being connected to the output member so that a rotation thereof is restricted, and
wherein the cover plate is spline-coupled to the lock-up clutch.

10. A hybrid driving module comprising:
a rotor hub configured to support a rotor, connected to an engine, and configured to receive power of the engine;
a first power transmission route configured to connect the rotor hub and an output member; and
a second power transmission route provided in parallel with the first power transmission route and configured to connect the rotor hub and the output member, the second power transmission route not being overlapped with the first power transmission route,
wherein the rotor hub has a radial extension portion, and an axial extension portion connected to an outer periphery of the radial extension portion,
wherein a lock-up clutch, which controls connection and disconnection between the rotor hub and the output member, and a damper between the lock-up clutch and the output member are provided in the second power transmission route,
wherein at least a part of the lock-up clutch is disposed radially inside the axial extension portion,
wherein the lock-up clutch has a lock-up piston configured to be movable in an axial direction,
wherein at least a part of the lock-up piston is disposed radially inside the axial extension portion,
wherein the lock-up piston comprises:
an inner radial extension portion extending in a radial direction while facing the radial extension portion of the rotor hub; and
an axis-extension portion extending in the axial direction and having a front end connected to a centrifugal side end of the inner radial extension portion,
wherein at least a part of the axis-extension portion of the lock-up piston is disposed radially inside the axial extension portion of the rotor hub,
wherein the damper is disposed radially inside the axis-extension portion of the lock- up piston, and
wherein the damper is spline-coupled to the axis-extension portion so that a rotation thereof is restricted.

11. The hybrid driving module of claim 10, wherein at least a part of the inner radial extension portion is disposed radially inside the axial extension portion of the rotor hub.

12. The hybrid driving module of claim 10, wherein the damper comprises:

a damper spring;

a cover plate connected to the lock-up clutch so that a rotation thereof is restricted, the cover plate being connected to the damper spring so that a rotation thereof is restricted; and a driven plate connected to the cover plate through the damper spring so that a rotation thereof is restricted, the driven plate being connected to the output member so that a rotation thereof is restricted, and wherein the cover plate is spline-coupled to the axis-extension portion.

13. The hybrid driving module of claim 10, wherein the rotor hub and the engine are connected through an engine clutch, wherein the inner radial extension portion and the axis-extension portion of the lock-up piston are disposed rearward of the radial extension portion of the rotor hub, and wherein the engine clutch is provided forward of the radial extension portion of the rotor hub and disposed radially inside the axial extension portion of the rotor hub.

14. A hybrid driving module comprising:

a rotor hub configured to support a rotor, connected to an engine, and configured to receive power of the engine;

a first power transmission route configured to connect the rotor hub and an output member; and a second power transmission route provided in parallel with the first power transmission route and configured to connect the rotor hub and the output member, wherein the rotor hub has a radial extension portion, and an axial extension portion connected to an outer periphery of the radial extension portion, wherein a lock-up clutch, which controls connection and disconnection between the rotor hub and the output member, is provided in the second power transmission route, wherein at least a part of the lock-up clutch is disposed radially inside the axial extension portion, wherein the lock-up clutch has a lock-up piston configured to be movable in an axial direction, wherein at least a part of the lock-up piston is disposed radially inside the axial extension portion, wherein the lock-up piston comprises:

an inner radial extension portion extending in a radial direction while facing the radial extension portion of the rotor hub; and an axis-extension portion extending in the axial direction and having a front end connected to a centrifugal side end of the inner radial extension portion, wherein at least a part of the axis-extension portion of the lock-up piston is disposed radially inside the axial extension portion of the rotor hub, wherein a damper is provided between the lock-up clutch and the output member, wherein the damper is disposed radially inside the axis-extension portion of the lock- up piston, wherein the damper comprises:

a damper spring;

a cover plate connected to the lock-up clutch so that a rotation thereof is restricted, the cover plate being connected to the damper spring so that a rotation thereof is restricted; and a driven plate connected to the cover plate through the damper spring so that a rotation thereof is restricted, the driven plate being connected to the output member so that a rotation thereof is restricted, and wherein the cover plate is spline-coupled to the axis-extension portion.

15. The hybrid driving module of claim 14, wherein at least a part of the inner radial extension portion is disposed radially inside the axial extension portion of the rotor hub.

16. The hybrid driving module of claim 14, wherein the rotor hub and the engine are connected through an engine clutch, wherein the inner radial extension portion and the axis-extension portion of the lock- up piston are disposed rearward of the radial extension portion of the rotor hub, and wherein the engine clutch is provided forward of the radial extension portion of the rotor hub and disposed radially inside the axial extension portion of the rotor hub.

* * * * *